(12) United States Patent
Rampure et al.

(10) Patent No.: US 10,611,968 B2
(45) Date of Patent: Apr. 7, 2020

(54) MINIMIZING COKE FORMATION IN A HYDROCARBON CRACKER SYSTEM

(71) Applicant: SABIC Global Technologies B.V., Bergen op Zoom (NL)

(72) Inventors: Mohanrao Rampure, Riyadh (SA); Abduljelil Iliyas, Riyadh (SA); Mustapha Karime, Riyadh (SA); Hatem Belfadhel, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/741,796

(22) PCT Filed: Jun. 29, 2016

(86) PCT No.: PCT/US2016/039944
§ 371 (c)(1),
(2) Date: Jan. 4, 2018

(87) PCT Pub. No.: WO2017/007649
PCT Pub. Date: Jan. 12, 2017

(65) Prior Publication Data
US 2018/0195008 A1   Jul. 12, 2018

Related U.S. Application Data

(60) Provisional application No. 62/190,446, filed on Jul. 9, 2015.

(51) Int. Cl.
*C10G 9/16* (2006.01)
*C10G 9/20* (2006.01)
(Continued)

(52) U.S. Cl.
CPC .............. *C10G 9/16* (2013.01); *C10G 9/20* (2013.01); *F16L 9/006* (2013.01); *F28F 1/40* (2013.01); *F28F 19/00* (2013.01); *B01J 2219/24* (2013.01)

(58) Field of Classification Search
CPC ........ B01J 19/00; B01J 19/24; B01J 2219/24; C10G 9/00; C10G 9/14; C10G 9/16; (Continued)

(56) References Cited

U.S. PATENT DOCUMENTS 4,510,988 A * 4/1985 Konoki ............... B01J 19/0026
                                                    164/102
5,206,880 A     4/1993 Olsson ................... 373/111
(Continued)

FOREIGN PATENT DOCUMENTS

CN    1671824 A     9/2005
CN    201770662 U   3/2011
(Continued)

OTHER PUBLICATIONS

"Dimple Tube Heat Exchanger." JBT FoodTech, Jun. 20, 2016. https://web.archive.org/web/20160620101735/http://www.jbtfoodtech.com/utils/print.aspx?pageid={3199603A-F06C-4005-8D5F-E2C883D40219}. Accessed Apr. 11, 2018.
(Continued)

*Primary Examiner* — Natasha E Young
(74) *Attorney, Agent, or Firm* — Norton Rose Fulbright US LLP

(57) ABSTRACT

The presently disclosed subject matter relates to an improved system for hydrocarbon cracking. In a specific non-limiting embodiment, a hydrocarbon cracker system can include one or more furnace tubes having a plurality of indentations disposed thereon, where the indentations do not project into the interior of the furnace tube.

17 Claims, 1 Drawing Sheet

(51) Int. Cl.
*F28F 1/40* (2006.01)
*F28F 19/00* (2006.01)
*F16L 9/00* (2006.01)

(58) Field of Classification Search
CPC .... C10G 9/20; F16L 9/00; F16L 9/006; F28F 1/00; F28F 1/10; F28F 1/40; F28F 19/00
See application file for complete search history.

(56) References Cited

U.S. PATENT DOCUMENTS

| | | | |
|---|---|---|---|
| 5,259,448 A | 11/1993 | Masukawa et al. | 165/133 |
| 5,577,555 A * | 11/1996 | Hisajima | F25B 15/06 165/133 |
| 5,645,417 A | 7/1997 | Smith | 432/152 |
| 5,839,505 A | 11/1998 | Ludwig et al. | 165/109.1 |
| 6,250,340 B1 | 6/2001 | Jones et al. | 138/177 |
| 7,482,502 B2 * | 1/2009 | Brown | C07C 4/04 585/652 |
| 2003/0019533 A1 | 1/2003 | Demarest et al. | 138/177 |
| 2004/0147794 A1 | 7/2004 | Brown et al. | 585/648 |
| 2005/0131263 A1 | 6/2005 | Wolpert et al. | 585/652 |
| 2005/0241605 A1 * | 11/2005 | Bedwell | F02M 29/14 123/184.21 |
| 2007/0287334 A1 | 12/2007 | Yagisawa et al. | 439/637 |
| 2008/0014342 A1 | 1/2008 | Jakobi et al. | 427/181 |
| 2008/0029243 A1 | 2/2008 | O'Donnell et al. | 165/48.1 |
| 2012/0180991 A1 | 7/2012 | Viswanathan et al. | 165/104.14 |

FOREIGN PATENT DOCUMENTS

| | | |
|---|---|---|
| CN | 102589337 A | 7/2012 |
| CN | 203269872 U | 11/2013 |
| EP | 0564665 B1 | 9/1997 |
| GB | 969796 | 9/1964 |
| GB | 2090651 A | 7/1982 |
| JP | 58-132081 | 8/1983 |
| JP | S6211797 A | 1/1987 |
| JP | 2000205783 A | 7/2000 |
| JP | 2004-536268 A | 12/2004 |
| JP | 2005-533917 A | 11/2005 |
| JP | 2006-517997 A | 8/2006 |
| KR | 101076317 B1 | 10/2011 |
| WO | WO2004015029 A1 | 2/2004 |
| WO | WO2004067681 A2 | 8/2004 |
| WO | WO2011013144 A2 | 2/2011 |

OTHER PUBLICATIONS

"Heat transfr intensification on surfaces with "eddy generating" relief at supersonic velocity on incident flow." Joint Scientific and Academic Laboratory, Thermogasdynamics. http://termogaz.imec.msu.ru/scientific%20results/supersonic%20dimple/supersonic%dimples_e.htm. Accessed Apr. 11, 2018.

"Simulation of a Golf Ball Trajectory." Kazuli, 2004. http://www.kazuli.com/UW/4B/SYDE454/golf1.htm. Accessed Apr. 11, 2018.

Chen et al., "Heat Transfer Enhancement in Dimpled Tubes." Applied Thermal Engineering 21 (2001) 535-547.

Seo et al., "Design and Performance Evaluation of Dimpled EGR Cooler," Transactions of the Korean Society of Mechanical Engineers A, vol. 34:3 (2010).

Vicente et al., "Heat transfer and Pressure Drop for Low Reynolds Turbulent Flow in Helically Dimpled Tubes," International Journal of Heat and Mass Transfer, vol. 45:3 (2002), 543-553.

Written Opinion and International Search Report from PCT/US2016/039944, dated Sep. 26, 2016, 12 pages.

Kryuchkov, Yu L. "Modernization of a tube furnace for the catalytic reforming of gasolines in L-35-11/1000 and LK-bu installations." Published 1980. Abstract Only. 1 page.

Kryuchkov, Yu L. "Modernization of tube furnaces for catalytic reforming of benzene at the L-35-11/1000 and LK-6U installations." Neftepererab. Neftekhim. Moscow USSR. Journal vol. 7. Published Jan. 1, 1980. Abstract Only. 4 pages.

European Extended Search Report from counterpart European Patent Application 16821822.0, dated Jan. 28, 2019, 6 pages.

* cited by examiner

MINIMIZING COKE FORMATION IN A HYDROCARBON CRACKER SYSTEM

CROSS-REFERENCE TO RELATED APPLICATIONS

This application is a national phase application under 35 U.S.C. § 371 of International Application No. PCT/US2016/039944, now WO/2017/007649,filed Jun. 29, 2016, which claims priority to U.S. Provisional Patent Application No. 62/190,446, filed Jul. 9, 2015.The entire contents of each of the above-references disclosures is specifically incorporated by reference herein without disclaimer.

FIELD

The presently disclosed subject matter relates to a system for the cracking of hydrocarbons.

BACKGROUND

Steam and catalytic cracking of hydrocarbons are important processes in the refining and petrochemical industry and is used to produce light olefins such as ethylene, propylene and butadiene from heavier and more complex organic molecules. These light olefins can be used as intermediates to generate other hydrocarbons such as polyethylene. Hydrocarbon cracking involves a cracking reaction of hydrocarbon feedstreams such as ethane or naphtha and can be carried out in tubular reactor systems.

Problems in hydrocarbon cracker reactor systems include the accumulation of hydrocarbon, e.g., coke, within the tubes and coils of the system. Such coke deposits can interfere with heat flow through the tube walls into the stream of reactants, which can result in higher tube metal temperatures and ultimately reaching the limits of the tube metallurgy. Additionally, the coke deposits can interfere with the flow of the reaction mixture due to a reduced tube cross sectional area and can result in higher pressure drops and a reduction in efficiency. This coke buildup can ultimately result in mandatory shutdown of the reactor and production loss.

Hydrocarbon cracker systems are known in the art. For example, European Patent No. EP0564665 discloses the presence of projections in the shape of longitudinal bars or ribs on the walls of hydrocarbon cracking furnace tubes to enlarge the internal surface of the tubes for heat exchange. Korean Patent Application No. KR1076317 discloses the use of hydrocarbon cracking reactor tubes that include indentations on their inner surface walls that project into the interior of the tube. Chinese Patent Application No. CN201770662 discloses the presence of inwardly projecting and axially spiral circular guide grooves on the wall of a cracking furnace tube to create a higher turbulence of the materials flowing through the tube. PCT Patent No. WO2011/013144 discloses a heat exchanger tube that has an inner surface with a plurality of inward projecting indentations that can be used in thermal processing plants and chemical processing units.

There remains a continued need in the art for hydrocarbon cracker systems that efficiently minimize hydrocarbon accumulation. The presently disclosed subject matter provides such significant advantages over currently available systems.

SUMMARY

The presently disclosed subject matter relates to an improved hydrocarbon cracker system.

In certain embodiments, the hydrocarbon cracker system of the present disclosure can include one or more reactor tubes with an inner surface having a plurality of indentations disposed thereon. In certain embodiments, the indentations do not project, i.e., protrude, into the interior of the reactor tube. In certain embodiments, the plurality of indentations minimizes coke formation on the inner surface of the reactor tube.

In certain embodiments, the indentations have a depth of about 0.2 mm to about 1.0 mm. In certain embodiments, the indentations have a depth of about 0.2 mm to about 0.5 mm.

In certain embodiments, the indentations are formed as an integral part of the reactor tube. In certain embodiments, the indentations are distributed uniformly along the length of the inner surface of the reactor tube. In certain embodiments, the indentations are arranged in parallel rows, in non-parallel rows, in branching patterns, in a staggered pattern, in circular patterns or combinations thereof. In certain embodiments, the indentations are rectangular, oval, star-shaped, triangle, square, octagon, hexagon in shape or combinations thereof.

The presently disclosed subject matter provides a hydrocarbon cracker including one or more reactor tubes with an inner surface having a plurality of indentations disposed thereon, where the indentations do not project into the interior of the reactor tube and have a depth of about 0.2 mm to about 1.0 mm. In certain embodiments, the indentations have a depth of about 0.2 mm to about 0.5 mm.

The presently disclosed subject matter further provides a furnace tube for cracking of hydrocarbons that includes a tubular body defined by a wall having an exterior surface and an inner surface, wherein the inner surface of the tubular body has a plurality of indentations disposed thereon. In certain embodiments, the indentations do not project into the interior of the tubular body. In certain embodiments, the plurality of indentations minimizes coke formation.

DETAILED DESCRIPTION

Figures 1A, 1B:
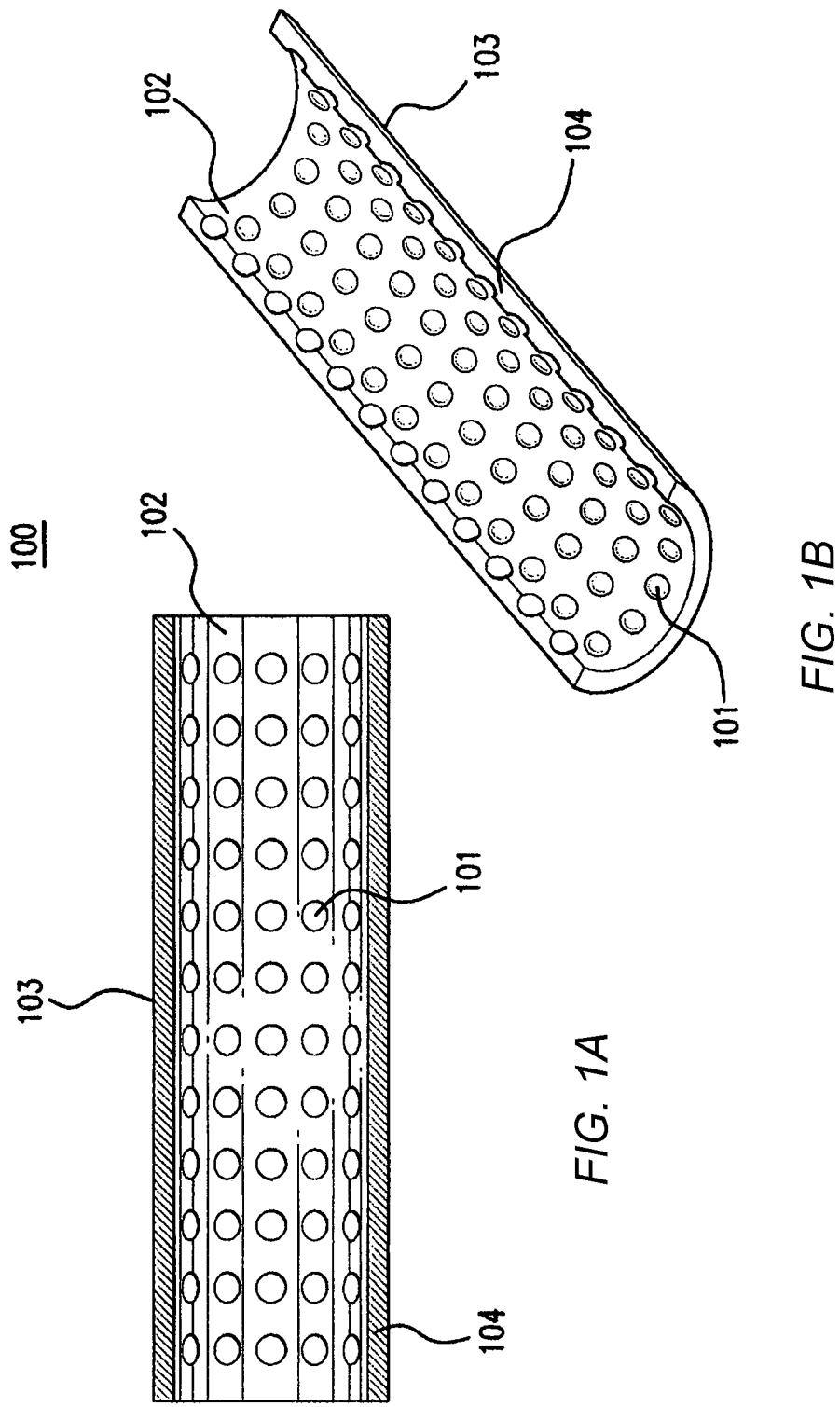
FIG. 1A depicts a cross-sectional view of a component of a hydrocarbon cracking system according to one exemplary embodiment of the disclosed subject matter.
FIG. 1B depicts a perspective cut-away view of a component of a hydrocarbon cracking system according to one exemplary embodiment of the disclosed subject matter.

The presently disclosed subject matter relates to an improved hydrocarbon cracker system.

The disclosed subject matter provides a hydrocarbon cracker system for the cracking of hydrocarbons and includes one or more components through which hydrocarbons flow during cracking. For example, and not by way of limitation, the one or more components of the hydrocarbon cracker system can include furnace tubes and coils.

For the purpose of illustration and not limitation, FIGS. 1A and 1B are views of exemplary hydrocarbon cracking tubes according to the disclosed subject matter. In certain embodiments, a component of the hydrocarbon cracker 100, e.g., a cracking tube, also referred to herein as a reactor tube or a furnace tube, which has a wall 104 having an inner surface 102 and an outer surface 103, and can have a plurality of indentations 101, e.g., depressions or dimples, present on its inner surface 102. In certain embodiments, the indentations do not project, i.e., protrude, into the interior of the hydrocarbon cracker component. In certain embodiments, the one or more indentations deform the inner surface 102 of the component wall inwardly (i.e., towards the outer surface).

In certain embodiments, the hydrocarbon cracker system of the presently disclosed subject matter can minimize coke formation on the inner surface of the one or more components of the hydrocarbon cracker and allow for longer operational times by the presence of the indentations on the inner surface of the one or more components of the system. In certain embodiments, the indentations can further result in an increase in the heat transfer ability of the component, e.g., by increasing the surface area of the inner surface of the component and increasing the turbulence along the inner surface. In certain embodiments, the indentations can reduce the drop in pressure of the fluid flowing through the component to increase the thermal efficiency of the component and the hydrocarbon cracking system.

The indentations present on the one or more components of the disclosed hydrocarbon cracking system can be of any shape including, but not limited to, circular, rectangular, oval, star-shaped, triangle, square, octagon, hexagon or combinations thereof. For example, the indentations can be circular in shape.

In certain embodiments, the indentations can be arranged in any manner, for example, the indentations can be arranged in parallel rows, in non-parallel rows, in branching patterns, in a staggered pattern, in circular patterns, or combinations thereof. For example, and not by way of limitation, the indentations can be arranged in parallel rows.

In certain embodiments, the indentations can be distributed continuously and/or uniformly along the length of the inner surface of the hydrocarbon cracker component. In certain embodiments, specific locations along the length of the inner surface of the hydrocarbon cracker component can have indentations. The indentations can be located at any position along the inner surface of the component of the hydrocarbon cracker. In certain embodiments, about 0.5%, about 1%, about 5%, about 10%, about 15%, about 20%, about 25%, about 30%, about 40%, about 50%, about 60%, about 70%, about 80%, about 90% or about 100% of the area of the inner surface of the one or more components of the hydrocarbon cracker can have indentations.

The term "about" or "approximately" means within an acceptable error range for the particular value as determined by one of ordinary skill in the art, which will depend in part on how the value is measured or determined, i.e., the limitations of the measurement system. For example, "about" can mean a range of up to 20%, up to 10%, up to 5%, and or up to 1% of a given value.

In certain embodiments, the depth of the indentation depends on the pitch and/or diameter of the indentations. In certain embodiments, the indentations can have a depth of about 0.2 millimeter (mm) to about 1.0 mm. For example, the indentations can have a depth of about 0.2 mm to about 0.95 mm, of about 0.2 mm to about 0.90 mm, of about 0.2 mm to about 0.85 mm, of about 0.2 mm to about 0.80 mm, of about 0.2 mm to about 0.75 mm, of about 0.2 mm to about 0.70 mm, of about 0.2 mm to about 0.65 mm, of about 0.2 mm to about 0.60 mm, of about 0.2 mm to about 0.55 mm, of about 0.2 mm to about 0.50 mm, of about 0.2 mm to about 0.45 mm, of about 0.2 mm to about 0.4 mm, of about 0.2 mm to about 0.35 mm, of about 0.2 mm to about 0.3 mm, of about 0.2 mm to about 0.25 mm, of about 0.25 mm to about 1.0 mm, of about 0.3 mm to about 1.0 mm, of about 0.35 mm to about 1.0 mm, of about 0.4 mm to about 1.0 mm, of about 0.45 mm to about 1.0 mm, of about 0.50 mm to about 1.0 mm, of about 0.55 mm to about 1.0 mm, of about 0.60 mm to about 1.0 mm, of about 0.65 mm to about 1.0 mm, of about 0.70 mm to about 1.0 mm, of about 0.75 mm to about 1.0 mm, of about 0.80 mm to about 1.0 mm, of about 0.85 mm to about 1.0 mm, of about 0.90 mm to about 1.0 mm or of about 0.95 mm to about 1.0 mm. In certain embodiments, the depth of the indentations is less than the thickness of the wall 104 of the component 100. Alternatively or additionally, the depth of the indentations can be greater than the thickness of the wall 104 of the component to result in the formation of protrusions on the outside surface of the wall 103. In certain embodiments, the depth of the indentations on the inner surface of the hydrocarbon cracker tube can vary.

In certain embodiments, the indentations on the one or more components can be generated by rolling, pressing, welding, hammering, extruding or embossing. In certain embodiments, the indentations and the component, e.g., furnace tube, can be made of the same material or the same sheet of material, e.g., formed as an integral part of the component. Alternatively, the indentations and the component can be made of the different materials.

In accordance with the embodiments of the subject matter previously described, the hydrocarbon cracker system and the various components and accessories that can be included in the hydrocarbon cracker system, e.g., furnace tubes, can be made out of a plurality of suitable materials. Suitable materials include, but are not limited to, aluminum, stainless steel, carbon steel, glass-lined materials, polymer-based materials, nickel-base metal alloys, cobalt-based metal alloys or combinations thereof.

The hydrocarbon cracker system of the disclosed subject matter can be used for the steam cracking, thermal cracking and/or catalytically cracking of simple saturated aliphatic hydrocarbons, such as ethane, mixtures of alkanes or petroleum cuts such as naphtha, atmospheric gas oil and vacuum gas oil. In certain embodiments, the hydrocarbon feedstream for use in the disclosed system can include steam cracked gas oil and residues, gas oil, heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, crude oil, atmospheric pipestill bottoms, vacuum pipestill streams including bottoms, wide boiling range naphtha to gas oil condensates, heavy non-virgin hydrocarbon streams from refineries, vacuum gas oils, heavy gas oil and naphtha contaminated with crude, atmospheric residue, heavy residue, $C_4$'s/residue admixtures, naphtha/residue admixtures, gas oil/residue admixtures and/or crude oil.

The hydrocarbon cracker system can further include additional components and accessories including, but not limited to, one or more feed lines, gas exhaust lines, cyclones, product discharge lines, reaction zones and heating elements. The hydrocarbon cracker system can also include one or more measurement accessories. The one or more measurement accessories can be any suitable measurement accessory known to one of ordinary skill in the art including, but not limited to, pH meters, pressure indicators, pressure transmitters, thermowells, temperature-indicating controllers, gas detectors, analyzers and viscometers. The components and accessories can be placed at various locations on the hydrocarbon cracker.

In addition to the various embodiments depicted and claimed, the disclosed subject matter is also directed to other embodiments having other combinations of the features disclosed and claimed herein. As such, the particular features presented herein can be combined with each other in other manners within the scope of the disclosed subject matter such that the disclosed subject matter includes any suitable combination of the features disclosed herein. The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the compositions and methods of the disclosed subject matter without departing from the spirit or scope of the disclosed subject matter. Thus, it is intended that the disclosed subject matter include modifications and variations that are within the scope of the appended claims and their equivalents.

Various publications, patents and patent applications are cited herein, the contents of which are hereby incorporated by reference in their entireties.

The invention claimed is:

1. A hydrocarbon cracker system comprising one or more reactor tubes with an inner surface having a plurality of indentations disposed thereon, wherein the indentations do not project into the interior of the reactor tube; wherein the indentations have a depth of 0.2 mm; and
   wherein the one or more reactor tubes comprise a nickel-base metal alloy.

2. The system of claim 1, wherein the indentations are formed as an integral part of the reactor tube.

3. The system of claim 2, wherein the indentations are distributed uniformly along the length of the inner surface of the reactor tube.

4. The system of claim 1, wherein the indentations are distributed uniformly along the length of the inner surface of the reactor tube.

5. The system of claim 1, wherein the indentations are formed as an integral part of the reactor tube.

6. The system of claim 1, wherein the indentations are distributed uniformly along the length of the inner surface of the reactor tube.

7. The system of claim 1, wherein the indentations are distributed uniformly along the length of the inner surface of the reactor tube.

8. The system of claim 1, wherein the depth of the indentations vary.

9. The system of claim 1, wherein the system further comprises at least one additional component selected from the group consisting of a feed line, a gas exhaust line, a cyclone, a product discharge line, a reaction zone, a heating element and a measurement accessory.

10. A hydrocarbon cracker system consisting of a reactor tube with an inner surface having a plurality of indentations disposed thereon, wherein the indentations do not project into the interior of the reactor tube; wherein the indentations have a depth of 0.2 mm; wherein the reactor tube consists of a nickel-base metal alloy, and wherein the indentations are arranged in a combination of parallel rows, in non-parallel rows, in branching patterns, in a staggered pattern and in circular pattern.

11. A hydrocarbon cracker comprising a reactor tube with an inner surface having a plurality of indentations disposed thereon, wherein the indentations do not project into the interior of the reactor tube and have a depth of 0.2 mm; and
   at least one additional component selected from the group consisting of a feed line, a gas exhaust line, a cyclone, a product discharge line, a reaction zone, a heating element and a measurement accessory;
   wherein the reactor tube comprises a nickel-base metal alloy.

12. A furnace tube for thermal cracking of hydrocarbons comprising a tubular body defined by a wall having an exterior surface and an inner surface, wherein the inner surface of the tubular body has a plurality of indentations disposed thereon, and wherein the indentations do not project into the interior of the tubular body, wherein the furnace tube comprises a nickel-base metal alloy.

13. The furnace tube of claim 12, wherein the furnace tube is positioned in a hydrocarbon cracker.

14. The furnace tube of claim 12, wherein the indentations are formed as an integral part of the furnace tube.

15. The furnace tube of claim 12, wherein the indentations are formed as an integral part of the reactor tube.

16. The furnace tube of claim 12, wherein the furnace tube further comprises a material selected from the group consisting of aluminum, a stainless steel, a carbon steel, a glass-lined material, a polymer-based material, and a cobalt-based metal alloy.

17. A hydrocarbon cracker comprising more than one furnace tube of claim 12.

* * * * *